Feb. 20, 1934.     J. O. PRESCOTT ET AL     1,948,077
CONVEYER STOP ANNOUNCING SYSTEM
Filed March 15, 1932     3 Sheets-Sheet 1
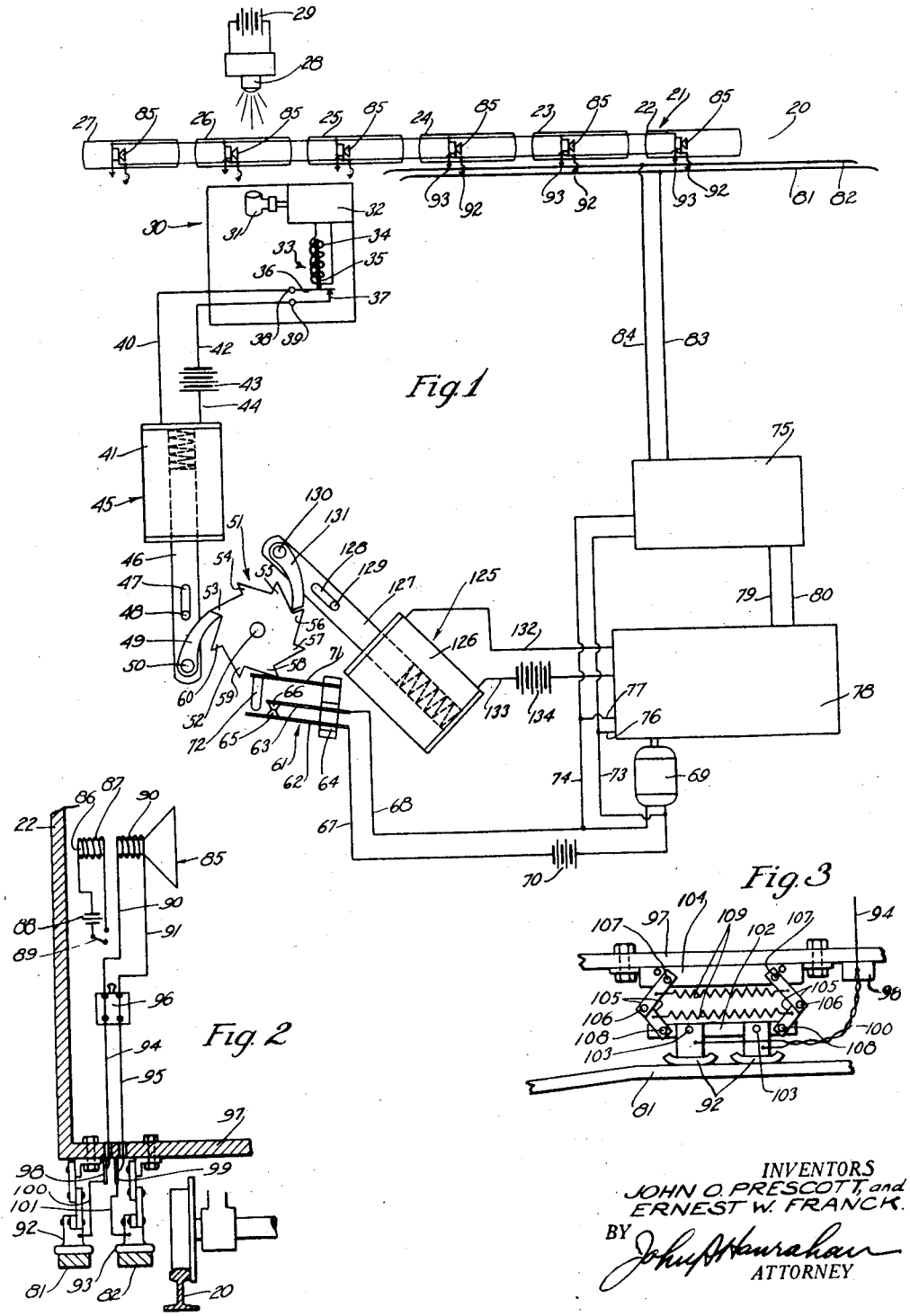
INVENTORS
JOHN O. PRESCOTT, and
ERNEST W. FRANCK.
BY John A Hanrahan
ATTORNEY

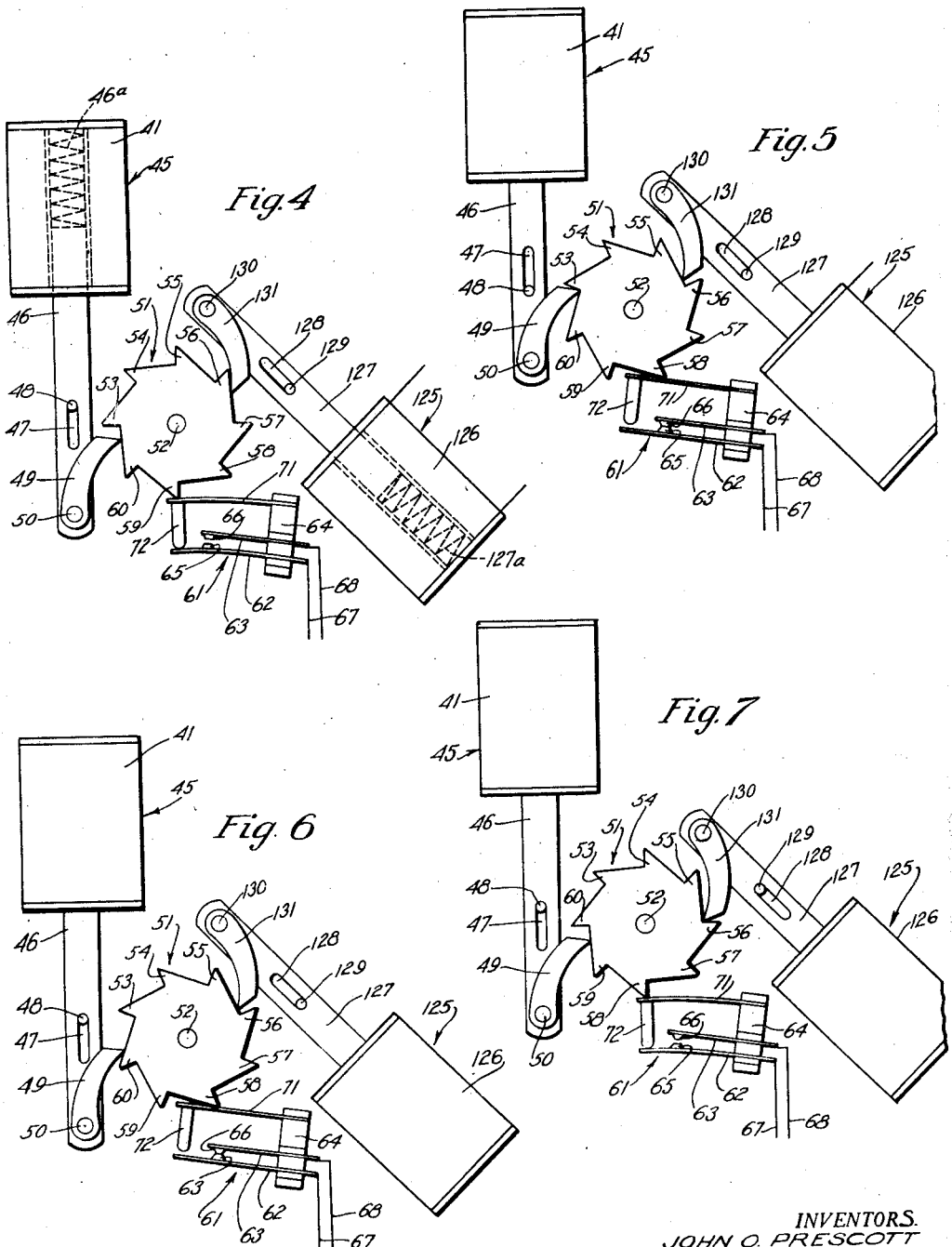

Feb. 20, 1934.  J. O. PRESCOTT ET AL  1,948,077
CONVEYER STOP ANNOUNCING SYSTEM
Filed March 15, 1932    3 Sheets-Sheet 3
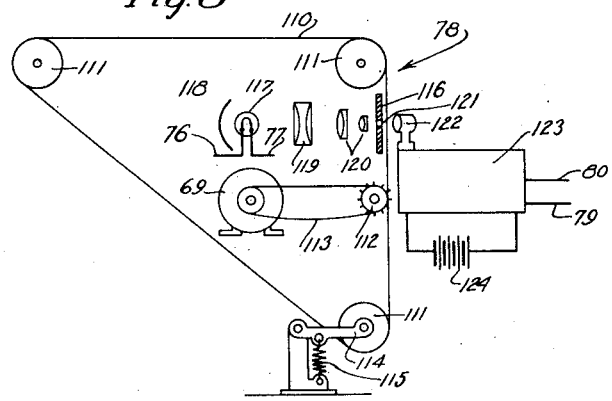
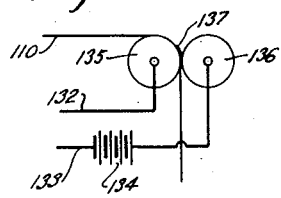
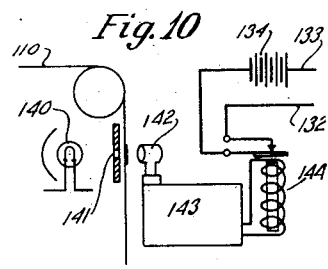
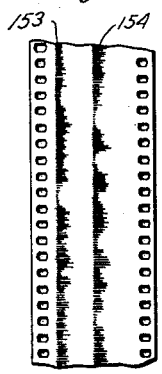
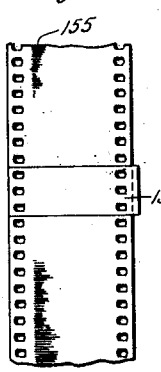
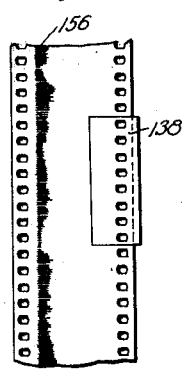
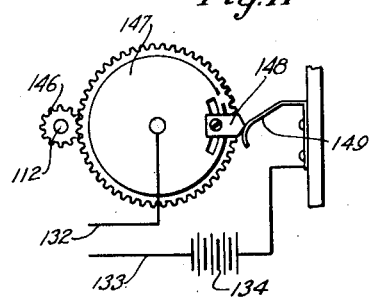
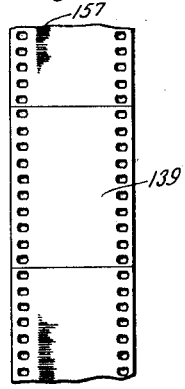
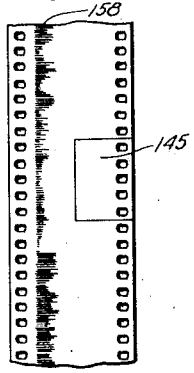
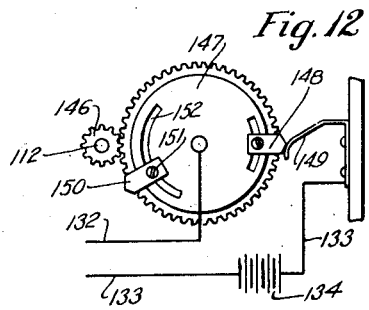
INVENTORS.
JOHN O. PRESCOTT, and
ERNEST W. FRANCK.
BY John J Hanrahan
ATTORNEY Patented Feb. 20, 1934

1,948,077

UNITED STATES PATENT OFFICE 1,948,077

CONVEYER STOP ANNOUNCING SYSTEM

John O. Prescott, Madison, and Ernest W. Franck, Paterson, N. J., assignors to Columbia Phonograph Company, Inc., Bridgeport, Conn., a corporation of New York Application March 15, 1932. Serial No. 598,920

14 Claims. (Cl. 246—29)

This invention relates to new and useful improvements in conveyer stop or station announcement means such as may be used in connection with subways, trains, elevated trains, elevators and the like.

The invention has for an object the providing of a means for the purpose indicated and which means is photo-electrically controlled.

Another object is to provide a means of the character stated and including optical sound impulse generating means for operation on a photographically recorded sound record which may be in the form of a film or otherwise and the reproducing of which does not involve the use of a stylus or other means to wear the record, whereby the record is adapted to give a large number of perfect reproductions and whereby the apparatus is adapted to operate without the necessity for the changing of styli.

A further object is to provide an apparatus as stated and which is simple in construction and therefore not likely to get out of order and which is entirely automatic in its operation.

The invention is, in some respects, an improvement on the system described and claimed in the application of John O. Prescott, Serial Number 528,581, filed April 8th, 1931, now Patent No. 1,870,294, dated August 9, 1932.

Additional objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:—

Figure 1 is a diagrammatic view showing the wiring arrangement of a complete system;

Fig. 2 is a vertical sectional view through a portion of a conveyer, as a car, showing the location of certain of the parts of the apparatus;

Fig. 3 is a view taken at right angles to Fig. 2, and showing the mounting of contact shoes adapted to form connections between a conveyer and bus bars located to be engaged by the shoes as the conveyer enters a station or just before it enter the station or as it leaves the station;

Figs. 4, 5, 6 and 7 are detail views showing a control mechanism in its different operating positions;

Fig. 8 is a more or less diagrammatic view illustrating a form of sound energy generating mechanism;

Fig. 9 is a similar view illustrating a form of stop control;

Fig. 10 is a similar view showing a photo-electrically operated stop control;

Fig. 11 shows yet another form of stop control;

Fig. 12 shows a form of stop control somewhat similar to that of Fig. 11 but including an adjustable element; and Figs. 13, 14, 15, 16 and 17 show various forms of films which may be used.

Referring in detail to the drawings, at 20 is shown a conveyer pathway as, for example, the tracks of a subway. In this connection it is to be noted that while the invention is herein particularly described and shown in its application to subway trains it is to be understood that the invention is also applicable to surface and elevated trains or cars, store elevators and the like and it is, therefore, to be understood that wherever in this specification or in the accompanying claims the word train or car or conveyer is used it is intended to use each and any of these words in a general sense only and it is intended when using any of these words to cover any apparatus used as a passenger conveyance.

Where the invention is applied to a store elevator the apparatus may be used for making announcements as to the goods for sale on the floor about to be reached as well as the number of the floor and while the elevator is stationary at a floor the apparatus may make an announcement as to whether the elevator is going up or down. When the apparatus is employed on a train, car or the like it may, as a station is being approached, give the name of the station and then make some announcement regarding stores in the vicinity. As the train is leaving the station an announcement may be made giving the name of the next station and also regarding stores in the vicinity of said next station.

In Fig. 1 a conveyer, as a subway train, 21 including cars 22, 23, 24, 25, 26, and 27 is shown on the pathway 20 and as either in or about to enter or about to leave a station or stop. Arranged at one side of the pathway 20 and at any desired point along the length of the same is any suitable light source 28 energized in any desired manner as from a source 29. At the opposite side of the pathway there is arranged a photo-electric relay 30.

This photo-electric relay may, as shown, include a photo-electric cell 31 arranged to receive light from the source 28 only, being effectively screened from other sources of light. Cell 31 acting in conjunction with a suitable thermionic device 32 controls a relay 33 including a coil 34 and a core 35, the latter being disposed to operate a movable magnetizable contact member 36 away from a fixed contact member 37. The contact members 36 and 37 are connected with terminals 38 and 39 respectively.

From the terminal 38 a wire or conductor 40 leads to one side of a solenoid coil 41 while a wire 42 connects the terminal 39 with any source of energy diagrammatically illustrated at 43 as a battery. A wire 44 connects the opposite side of the source of energy 43 with the solenoid coil 41. The solenoid which includes the coil 41 is generally designated 45 and this solenoid includes a core 46 of a length to always extend beyond the coil and toward its outer end this core is slotted as at 47 and in the slot there is disposed a limiting pin 48.

A pawl 49 is pivotally mounted on the outer end portion of the core 46 as by means of a pin, rivet or the like 50. This pawl is adapted to co-operate with a ratchet generally designated 51 mounted for rotary movement as by a shaft 52 and the teeth of which are designated 53, 54, 55, 56, 57, 58, 59 and 60. The ratchet may have more or fewer teeth than shown and while the teeth are identical one with the other they have been given separate numbers to aid in the description.

Ratchet wheel 51 controls a switch 61 including elements 62 and 63 mounted in an insulating block 64 and carrying contacts 65 and 66 respectively. The elements 62 and 63 are included in a circuit including wires 67 and 68 connected with a motor 69 and one of the wires as, for example, the wire 67 is connected with a source of energy indicated as a battery 70. Actual control of the switch 61 by the ratchet 51 takes place through a spring member 71 having one end secured to the block 64 and at its other end carrying a pin 72 so disposed that on the member being depressed by the ratchet the said pin will engage the switch element 62 and carry the same downwardly shifting the contact 65 away from the contact 66 and opening the circuit to the motor 69.

From the wires 67 and 68 other wires 73 and 74 lead to a power amplifier 75 and leads 76 and 77 from the wires 73 and 74 are carried to a photo-electric sound record apparatus 78 shown more in detail in Fig. 8. The output from the photo-electric sound record reproducing apparatus 78 is carried to the power amplifier 75 as by wires 79 and 80 and from the power amplifier the current impulses are delivered to bus bars 81 and 82 as through the wires or conduits 83 and 84. The details of the parts thus far referred to will later be fully described.

One or more loud speakers diagrammatically illustrated at 85 may be provided on or in an elevator, or each car of a train or the like. Each speaker may include a field magnet 86 the coil 87 of which is adapted to be excited as from a battery 88 on the closing of a switch 89. The voice coil 90 of the loud speaker is included in the circuit with wires 90 and 91 connected with contact shoes 92 and 93 adapted to engage the bus bars 81 and 82 as will later more fully appear.

As shown in Fig. 2 wires 90 and 91 are connected with wires 94 and 95 through a suitable emergency switch 96 positioned for opening and closing by one of a train crew or by an elevator operator or the like. Wires 94 and 95 pass through openings in the floor 97 of any of the cars of the train 21 the car 22 being used for the purpose of illustration. Beneath the floor these wires are connected with terminals 98 and 99 which terminals have wires 100 and 101 from the shoes 92 and 93 respectively connected with them.

Two shoes 92 and two shoes 93 are used for engagement with the respective bus bars 81 and 82. These bus bars may have an inclined approach portion as shown in Fig. 3 whereby the shoes will ride up onto the bars as the conveyer approaches a station or stop. Each set of shoes is mounted the same and the mounting is clearly shown in Fig. 3 wherein details of the mounting of shoes 92 are illustrated.

Shoes 92 are pivotally connected with a longitudinally extending link or bar 102 as at 103 and this bar 102 is connected with a mounting plate 104 through the medium of links 105 pivotally connected as at 106 and having their respective outer end portions pivoted to the plate 104 and the bar 102 as at 107 and 108 respectively. Connecting the respective links 105 are coil springs 109, these springs normally tending to straighten the links and move the shoes in a direction away from the car. Such action on the part of the springs obviously causes the shoes 92 and 93 to ride firmly against the bus bars whereby a good electrical connection is obtained.

The bus bars 81 and 82 may be arranged to be enegaged by the shoes 92 and 93 as a train approaches a station or stop or as the train leaves a station or the bus bars may be arranged to be engaged on both of these occasions. In fact, the bus bars may be so arranged that the shoes will be in engagement with the bus bars while a train or other conveyer is at a station. This will, of course, give an announcement during the time the conveyer is stationary as when it is discharging and receiving passengers. As the bus bars are connected with the power amplifier voice currents generated as will be hereinafter described are delivered by the amplifier to the bus bars and taken from the bus bars by the shoes and delivered to the loud speakers. It is therefore important that a good connection be made between the bus bars and the shoes to prevent any interruption due to any irregularities or rough places in or on the bus bars, and for this reason two spring pressed shoes are engaged with each bus bar.

One form of voice current generating means is suggested in Fig. 8. In this figure an endless photographic sound record film 110 of a desired length is trained over a series of pulleys 111 and is arranged to be driven as by a sprocket 112 which in turn is driven from the motor 69 through a belt or other drive 113. One of the pulleys or idlers 111 may be in the form of a take-up idler mounted on a bar 114 influenced by coil spring 115 whereby to maintain the proper tension on the film.

The film record travels past an aperture in a gate 116 and through this aperture passes a beam of light from a source 117 in the rear of which may be disposed a reflector 118 and the said beam of light may be condensed as by condensing lenses 119 and focused by objective lenses 120 on the aperture 121 in the gate 116. This photographic sound record 110, which may be of the variable area or variable density type, passing the aperture 121 modulates the beam of light as it passes through the record area, and the modulated light beam operates a photo-electric cell 122 which in conjunction with a preliminary amplifier 123 energized as from a source 124 produces any announcement on the film, in the form of electrical energy varying in intensity with the intensity of the light beam passing through the recorded portion of the film.

The sound record may be of any desired form and may be one of the forms illustrated in Figs. 13 through 17 and include one or more sound tracks. When the record film has a plurality of photographed sound tracks the reproducing apparatus or the voice current generating apparatus will, of course, contain mechanism for automatically shifting from one track to another as desired or required. The preliminary amplifier 123 is connected with the power amplifier through the leads 79 and 80 above referred to whereby the output of the preliminary amplifier is delivered to the power amplifier and then to the bus bars.

With the apparatus thus far described an announcement will be made as a train enters or leaves a station or while the train is at a station or stop as desired. Assuming that the train 21 of Fig. 1 is entering a station the shoes 92 and 93 of one or more cars will be in engagement with the respective bus bars 81 and 82. As the train enters the station it will interrupt the beam of light from the source 28 to the photo-electric cell 31 and the coil 34 will be de-energized with the result that the contact member 36 will move into engagement with the contact member 37.

This will result in the solenoid 45 being energized whereby the pawl 49 will be drawn upwardly to shift the ratchet 51 from a normal position as shown in Fig. 4 to an operating position as shown in Figs. 1 and 5. The switch element 62 will then be permitted to move upwardly whereby contact 65 will engage contact 66 and the circuit through the wires 67 and 68 will be closed energizing the motor 69, and the wires 73 and 74 and the mechanism connected with them.

The motor will then drive the record film, the light source 117 will be energized and currents will be generated by the photo-electric cell 122, delivered to the preliminary amplifier 123 and through leads 79 and 80 to the power amplifier 75 from which the voice currents will be delivered to the bus bars through the leads 83 and 84. The transmission of these voice currents from the bus bars to the loud speakers has already been fully described. After the light beam from the source 28 has been interrupted and an announcement started should the light beam again strike the photo-electric cell 31 no interruption of the announcement will result. This will later more fully appear.

With the apparatus as thus far described, any announcement contained on the film 110 would be constantly repeated once started. Means are therefore provided for discontinuing the announcement and this means may become effective after the entire film has passed the aperture 121 or the means may become effective when but a portion of the film has been reproduced. Several possible stop controls are shown in Figs. 4 through 12 and that shown in Fig. 4 will first be described.

The stop mechanism includes a solenoid generally designated 125 and including a coil 126 and a core 127 the latter being provided with an elongated slot 128 in which is disposed a stationary pin or stop 129. To the outer end portion of the core 127 there is pivoted as at 130 a pawl 131 adapted to co-operate with the ratchet 51 and to give said ratchet a partial turn at the proper time and bring about an opening or separation of the contacts 65 and 66 whereby to open the circuit between the wires 67 and 68 and stop the apparatus. Figs. 9 through 12 illustrate various means which may be employed for closing a circuit to the solenoid 125 at the proper time. However, before referring in detail to this structure it is thought best to describe the operation of the solenoid 125 with reference to the ratchet 51.

For this purpose, reference is had to Figs. 4 through 7. In Fig. 4 the parts are shown in their normal positions as when the beam of light from the source 28 is trained on the photo-electric cell 31 and the circuit to the solenoid 45 is open. On the light beam to the photo-electric cell being interrupted the elements 36 and 37 engage and the solenoid 45 is energized with the result that the core 46 is drawn into the coil 41. This upward movement of the core results in a corresponding upward movement of the pawl 49 and the latter engaging the tooth 53 of the ratchet imparts a partial turn thereto. Pin 48 operating in slot 47 limits this upward movement as shown in Fig. 5 whereby the ratchet is not moved the full distance between successive teeth.

However, the movement is sufficient to carry the tooth 59 off the member 71 with the result that this member moves upwardly permitting the switch element 62 to move upwardly and bring its contact 65 into engagement with the contact 66. The circuit including the leads 67 and 68 is therefore closed on interruption of the light beam to the cell 31. The record or film 110 is thereupon reproduced as above described and the message on the film broadcast in the conveyer as the elevator, car or the like, through a loud speaker. At the end of the record or at the desired time means (later to be described) associated with the means 78 operates to close a circuit through the leads 132 and 133 the latter being connected with a source of energy 134 and the two leads being connected with the coil 126 of the solenoid 125.

As the solenoid 125 is energized, its core 127 is drawn inwardly as shown in Fig. 7 with the result that its pawl 131 is carried downwardly engaging the tooth 56 of the ratchet and shifting said tooth from the position shown in Figs. 5 and 6 to that shown in Fig. 7. This movement of the ratchet results in the tooth 60 being carried to a position above the end of the pawl 49 from its position of Fig. 6 to that of Fig. 7. Also, this movement of the ratchet results in the tooth 58 being shifted from its position of Figs. 5 and 6 to its position as shown in Fig. 7 where it has operated to press the member 71 and pin 72 carried thereby in a manner to shift the switch element 62 downwardly carrying the contact 65 away from the contact 66 opening the circuit through the leads 67 and 68. This, of course, brings about a stopping of the reproduction.

A comparison of Figs. 4 and 5 will clearly show that the circuit through the leads 67 and 68 is open when the parts are as shown in Fig. 4 and that the pawl 49 is in position to engage the tooth 53 and shift the ratchet while the pawl 131 is on top of the tooth 56. In Fig. 5 the ratchet has been shifted to the limit of the movement of the core 46 since the pin 48 is there disposed in the lower end of the slot 47. However, the ratchet has been so far shifted that tooth 56 is below the pawl 131 in position to be engaged thereby when the pawl 131 is next moved or operated.

In Fig. 6 the solenoid 45 has again been de-energized and the core 46 has been expelled as by spring 46a or has dropped to a normal position. The ratchet in this figure is in the same position in which it is shown in Fig. 5. However, the pawl 49 is not positioned to engage the next tooth of the ratchet, that is the tooth 60, should the solenoid 45 be again energized. Should this happen, the pawl will simply be drawn up into the position shown in Fig. 5 and the ratchet will not be moved.

The next shifting of the ratchet takes place when the device is to be stopped and on the solenoid 125 being energized. In Fig. 6 it will be noted that the pawl 131 is positioned to engage the tooth 56 of the ratchet and when solenoid 125 is energized its core 127 will be drawn inwardly moving the pawl 131 in a direction to engage the tooth 56 and impart a partial turn to the ratchet 51. That is, the ratchet, the pawl 131 and the core 127 will be shifted from their respective positions as shown in Figs. 5 and 6 to their positions as shown in Fig. 7 when the coil 126 is energized. This, as above explained, results in the opening of the switch 61 and further results in another tooth of the ratchet, that designated 60, being shifted into a position above the pawl 49 whereby it will be engaged by said pawl and the ratchet shifted to permit closing of the circuit through the leads 67 and 68 on the solenoid 45 being again energized.

Referring to that form of means for closing the circuit through the leads 132 and 133 and which means is shown in Fig. 9 a pair of contact rolls 135 and 136 are arranged one at each side of the record film 110 and connected with these respective rolls are the leads 132 and 133. The film used with these rolls may be as shown in Figs. 14, 15 or 16 and may have a strip of metal 137 wrapped about it at the stopping point as shown in Fig. 14 or may have a strip of metal 138 bent about its non-recorded edge as shown in Fig. 15 or may include a metal insert 139 as shown in Fig. 16. In either event this metal part when passing between the rolls 135 and 136 will close a circuit through the leads 132 and 133 whereby the solenoid 125 will be energized with the result above set forth Fig. 10 shows another suggested means for controlling the solenoid 125. In this figure light from a source 140 is directed onto the film through an aperture 141 and through the film to a photo-electric cell 142 connected with a thermionic device 143 acting to keep the relay 144 open. On the metal parts 137, 138 or 139 of Figs. 14, 15 and 16 coming opposite the aperture 141 or on the opaque portion 145 of Fig. 17 coming opposite this aperture light reaching the photo-electric cell 142 will be interrupted and the relay 144 will be momentarily closed whereby the circuit through the leads 132 and 133 will be closed energizing the solenoid 125.

Fig. 11 shows a further suggested control for the solenoid 125 and in this figure a pinion 146 is shown as driven by the shaft of sprocket 112 and this pinion meshes with and drives a gear 147 comprising an electrical conducting member. The lead 132 is shown connected to this gear 147 and the gear also carries a contact member 148 projecting beyond the periphery of the wheel and adapted at the proper time to engage a contact 149 to which the wire 133 is connected and thereby close the circuit between the wires or leads 132 or 133 to bring about energization of the solenoid 125 as from the battery 134 or other source. The contact 148 may be adjustable in an arcuate slot as shown.

In Fig. 12 is shown a further slightly modified structure and in this figure the wheel or gear 147 in addition to carrying the contact 148 also carries a contact 150 adapted to be secured in adjusted position as by means of a screw 151 operating in an arcuate slot 152 in the gear. With this form of device the reproducing mechanism may be operating with a film having two messages recorded thereon. As a train enters a station one message will be broadcast and the apparatus brought to a stop on the contact 148 engaging the contact spring 149 at which time the apparatus will be stopped. As the train leaves the station, the apparatus will be started and will again be stopped on the contact 150 engaging the spring contact 149. Since the contact 150 may be adjusted it will be obvious that one announcement may be longer than the other and the contact 150 adjusted accordingly.

As above suggested, Figs. 13 through 17 show various forms of film to be used. This film or record may be of any desired kind or type as, for example, the variable area or the variable density type and the film may contain one or more recordings or one or more lines of recording. In Fig. 13 two lines of recording 153 and 154 are shown and these lines may represent separate recordings or they may be continuous. Fig. 14 has but a single line of recording 155 beginning and stopping in some spaced relation to the strip of metal 137 which strip is doubled about the edge of the film so as to be exposed on each of its sides. The metal strip 138 of Fig. 15 does not cross the entire film but is disposed only at one edge thereof being exposed on both sides thereof whereby it does not interfere with the sound line 156.

In Fig. 16 the sound line 157 has a beginning and an end in spaced relation to the metal insert which serves as a connection between two ends of the film. With the arrangement shown in Fig. 17 the sound line 158 is not interrupted but the small portion 145 of the film is rendered opaque whereby the film will be operable in connection with a stop control means as shown in Fig. 10.

It will be understood that either of the films of Figs. 14, 15 and 16 may be used with the control of Fig. 9 and that either of these films together with the film of Fig. 17 might be used in connection with the stop control means of Fig. 10. Since the control means of Figs. 11 and 12 is in no wise dependent on the film used but is driven either from the shaft of sprocket 112 or in any other manner in timed relation with the film, any type of film may be used.

Having thus described the invention, what is claimed is:

1. In a conveyer stop announcing system, in combination, a pathway for a conveyer, a photo-electric relay, a source of light positioned to direct a beam of light onto said relay and have said beam interrupted by a conveyer traveling along said pathway, a normally open circuit, means controlled by said relay and operable to close said circuit on interruption of said light beam, a second normally open circuit, means including means in said first normally open circuit for closing the second normally open circuit on closing of the first normally open circuit by interruption of said light beam, said means comprising a pair of contacts in the second circuit, a solenoid in the first circuit, a ratchet wheel operable to permit said contacts to move into operable to permit said contacts to move into engagement, a pawl movable by said solenoid and adapted to operate said ratchet wheel, sound energy generating means controlled by said second circuit, a bus bar along a portion of said pathway, a connection between said sound energy generating means and the bus bar, a conveyer, a loud speaker on the conveyer, means on the conveyer to engage the bus bar, and said means connected with the loud speaker whereby sound energy delivered to the bus bar will be transmitted to and reproduced by the loud speaker when the means on the conveyer engages the bus bar.

2. In a conveyer stop announcing system, in combination, a pathway for a conveyer, a photo-electric relay, a source of light positioned to direct a beam of light onto said relay and have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage the bus bar, said means connected with the loud speaker whereby sound energy delivered to the bus bar will be transmitted to and reproduced by the loud speaker, and means operable by said sound energy generating means to cause a re-opening of said normally open circuit.

3. A conveyer stop announcing system comprising a pathway for a conveyer, a photo-electric relay, a source of light positioned to direct a beam of light onto said relay and have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage the bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, and means controlled by said sound energy generating means for closing the second circuit.

4. In a conveyer stop announcing system, in combination, a pathway for a conveyer, a photo-electric relay, a source of light positioned to direct a beam of light onto said relay and have said beam interrupted by a conveyer traveling along said pathway, a normally open circuit, means controlled by said relay and operable to close said circuit on interruption of said light beam, a second normally open circuit, means including means in said first normally open circuit for closing the second normally open circuit on closing of the first normally open circuit by interruption of said light beam, said means comprising a pair of contacts in the second circuit, a solenoid in the first circuit, a ratchet wheel operable to permit said contacts to move into engagement, a pawl movable by said solenoid and adapted to operate said ratchet wheel, sound energy generating means controlled by said second circuit, a bus bar along a portion of said pathway, a connection between said sound energy generating means and the bus bar, a conveyer, a loud speaker on the conveyer, means on the conveyer to engage the bus bar, said means connected with the loud speaker whereby sound energy delivered to the bus bar will be transmitted to and reproduced by the loud speaker when the means on the conveyor engages the bus bar, and means operable by said sound energy generating means to cause a re-opening of said normally open circuit.

5. In a conveyer stop announcing system, in combination, a pathway for a conveyer, a photo-electric relay, a source of light positioned to direct a beam of light onto said relay and have said beam interrupted by a conveyer traveling along said pathway, a normally open circuit, means controlled by said relay and operable to close said circuit on interruption of said light beam, a second normally open circuit, means including means in said first normally open circuit for closing the second normally open circuit on closing of the first normally open circuit by interruption of said light beam, said means comprising a pair of contacts in the second circuit, a solenoid in the first circuit, a ratchet wheel operable to permit said contacts to move into engagement, a pawl movable by said solenoid and adapted to operate said ratchet wheel, sound energy generating means controlled by said second circuit, a bus bar along a portion of said pathway, a connection between said sound energy generating means and the bus bar, a conveyer, a loud speaker on the conveyer, means on the conveyer to engage the bus bar, said means connected with the loud speaker whereby sound energy delivered to the bus bar will be transmitted to and reproduced by the loud speaker when the means on the conveyer engages the bus bar, and means operable at a predetermined time to re-open said normally open circuit and de-energize the sound energy generating means.

6. In a conveyer stop announcing system, in combination, a pathway for a conveyer, a photo-electric relay, a source of light positioned to direct a beam of light onto said relay and have said beam interrupted by a conveyer traveling along said pathway, a normally open circuit, means controlled by said relay and operable to close said circuit on interruption of said light beam, a second normally open circuit, means including means in said first normally open circuit for closing the second normally open circuit on closing of the first normally open circuit by interruption of said light beam, said means comprising a pair of contacts in the second circuit, a solenoid in the first circuit, a ratchet wheel operable to permit said contacts to move into engagement, a pawl movable by said solenoid and adapted to operate said ratchet wheel, sound energy generating means controlled by said second circuit, a bus bar along a portion of said pathway, a connection between said sound energy generating means and the bus bar, a conveyer, a loud speaker on the conveyer, means on the conveyer to engage the bus bar, said means connected with the loud speaker whereby sound energy delivered to the bus bar will be transmitted to and reproduced by the loud speaker when the means on the conveyer engages the bus bar, means operable at a predetermined time to re-open said normally open circuit and de-energize the sound energy generating means, said last means including a normally open circuit, means in said circuit adapted on closing of the circuit to bring about a re-opening of the first normally open circuit, and means controlled by said sound energy generating means for closing the second normally open circuit.

7. In a conveyer stop announcing system, in combination a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, and means operable at a predetermined time to re-open said normally open circuit and de-energize the sound energy generating means.

8. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, means for closing said second circuit to bring about energizing of said means, said sound energy generating means including a film, and said means for closing said second circuit including said film.

9. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, said second normally open circuit including a pair of contacts, said sound energy generating means including a film passing between said contacts, and said film including means for engaging and closing a circuit between said contacts to effect closing of the second circuit.

10. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, and said last means including a photo-electric relay controlled by said sound energy generating means.

11. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a lound speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, means for closing said second circuit to bring about energizing of said means, said sound energy generating means including a film, and a photo-electric means co-operating with said film and adapted to bring about a closing of said second circuit.

12. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, means for closing said second circuit to bring about energizing of said means, a rotatable member operable in certain timed relation with said sound energy generating means, and a contact movable with said rotatable member and adapted at a predetermined time to close said second normally open circuit.

13. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, means for closing said second circuit to bring about energizing of said means, a rotatable member operable in certain timed relation with said sound energy generating means, and a contact movable with and adjustable on said rotatable member and adapted at a predetermined time to close said second normally open circuit.

14. In a conveyer stop announcing system, in combination, a pathway for a conveyer, a photoelectric relay, a source of light positioned to direct a beam of light onto said relay and to have said beam interrupted by a conveyer traveling along said pathway, a normally open circuit, means operable to close said circuit on interruption of said beam of light, sound energy generating means controlled by said circuit, a bus bar along a portion of said pathway, a connection between said sound energy generating means and the bus bar, a conveyer, a loud speaker on the conveyer, means on the conveyer to engage said bus bar, said means connected with the loud speaker whereby sound energy delivered to the bus bar will be transmitted to and reproduced by the loud speaker, means operable at a predetermined time to re-open said normally open circuit and de-energize the sound energy generating means, said last means including a normally open circuit, means in said circuit adapted on closing of the circuit to bring about a re-opening of the first normally open circuit, means for closing said second circuit to bring about energizing of said means, a rotatable member operable in certain timed relation with said sound energy generating means, and a plurality of contacts movable with and adjustable on said rotatable member and adapted at a predetermined time to close said second normally open circuit.

JOHN O. PRESCOTT.
ERNEST W. FRANCK.